United States Patent
Leslie et al.

(10) Patent No.: US 10,866,136 B2
(45) Date of Patent: Dec. 15, 2020

(54) SYSTEM AND METHOD OF CALCULATING A PAYLOAD WEIGHT

(71) Applicant: CQMS Pty Ltd, Queensland (AU)

(72) Inventors: Bruce Alexander Leslie, Queensland (AU); Nicholas Simon Hillier, Queensland (AU)

(73) Assignee: CQMS PTY LTD, Queensland (AU)

(*) Notice: Subject to any disclaimer, the term of this patent is extended or adjusted under 35 U.S.C. 154(b) by 463 days.

(21) Appl. No.: 15/538,618

(22) PCT Filed: Dec. 24, 2014

(86) PCT No.: PCT/AU2014/050448
§ 371 (c)(1),
(2) Date: Jun. 21, 2017

(87) PCT Pub. No.: WO2016/101001
PCT Pub. Date: Jun. 30, 2016

(65) Prior Publication Data
US 2017/0350750 A1    Dec. 7, 2017

(51) Int. Cl.
*G01G 19/08* (2006.01)
*E02F 9/26* (2006.01)
*E02F 9/24* (2006.01)
*E02F 3/32* (2006.01)
*G01G 19/10* (2006.01)

(52) U.S. Cl.
CPC .............. *G01G 19/08* (2013.01); *E02F 9/24* (2013.01); *E02F 9/26* (2013.01); *E02F 9/264* (2013.01); *E02F 9/267* (2013.01); *G01G 19/083* (2013.01); *E02F 3/32* (2013.01)

(58) Field of Classification Search
CPC . G01G 19/08; G01G 19/10; E02F 9/24; E02F 9/26
See application file for complete search history.

(56) References Cited

U.S. PATENT DOCUMENTS

| | | | | |
|---|---|---|---|---|
| 4,499,960 A | | 2/1985 | Ehrich | |
| 4,627,013 A | * | 12/1986 | Ichiyama | E02F 9/264 177/141 |
| 5,178,226 A | * | 1/1993 | Bowman | B65F 3/04 177/139 |
| 5,416,706 A | * | 5/1995 | Hagenbuch | G01G 19/08 177/136 |
| 5,824,965 A | * | 10/1998 | Fujii | G01G 19/12 177/136 |
| 6,518,519 B1 | * | 2/2003 | Crane, III | E02F 9/264 177/136 |

(Continued)

OTHER PUBLICATIONS

Extended European Search Report for EP Application No. 14908648.0 dated Aug. 10, 2018; 7 pages.

*Primary Examiner* — Catherine T. Rastovski
(74) *Attorney, Agent, or Firm* — Schwabe Williamson & Wyatt, PC

(57) ABSTRACT

A system of calculating a payload weight, the system including: a first sensor configured to measure a first load associated with a first member of a lifting machine; a second sensor configured to measure a second load associated with a second member of the lifting machine; and a calculating device configured to calculate the payload weight being carried by the lifting machine based on the first load and the second load.

12 Claims, 3 Drawing Sheets

(56) References Cited

U.S. PATENT DOCUMENTS

| | | |
|---|---|---|
| 8,515,627 B2 | 8/2013 | Marathe |
| 8,660,758 B2 * | 2/2014 | Janardhan ............... E02F 9/264 |
| | | 701/50 |
| 2006/0070773 A1 * | 4/2006 | Dahl .................... G01G 19/083 |
| | | 177/136 |
| 2009/0018718 A1 * | 1/2009 | Lang ...................... G06Q 10/06 |
| | | 701/31.4 |
| 2009/0139119 A1 | 6/2009 | Janardhan |
| 2009/0143896 A1 * | 6/2009 | Janardhan ............. B25J 9/1638 |
| | | 700/213 |
| 2014/0019015 A1 | 1/2014 | Claxton |
| 2014/0291038 A1 | 10/2014 | Hague |

* cited by examiner

SYSTEM AND METHOD OF CALCULATING A PAYLOAD WEIGHT

CROSS-REFERENCE TO RELATED APPLICATION

The present application is a national phase entry under 35 U.S.C. § 371 of International Application No. PCT/AU2014/050448, filed Dec. 24, 2014, entitled "A SYSTEM AND METHOD OF CALCULATING A PAYLOAD WEIGHT," which designates the United States of America, the entire disclosure of which is hereby incorporated by reference in its entirety.

FIELD OF THE INVENTION

The invention relates to a system and method of calculating a payload weight. In particular, the invention relates, but is not limited, to a system and method of calculating a payload weight in an excavator bucket.

BACKGROUND TO THE INVENTION

Reference to background art herein is not to be construed as an admission that such art constitutes common general knowledge in Australia or elsewhere.

Hydraulic operated equipment is commonly used for conveniently moving payloads. However, when payload weight is overestimated in, for example, an excavator bucket, the excavator bucket may be underloaded. This decreases productivity as a user may have to make further trips to complete a task. On the other hand, when payload weight is underestimated, this may increase the risk of damage to the excavator due to overloading. Similarly, underestimating payload weight may cause overloading of downstream equipment (i.e. trucks, conveyors etc.) when the payload is delivered thereto. This may cause failure, shutdown or reduced performance of the downstream equipment, which again decreases productivity.

A current example of calculating payload weight is, after an excavator delivers a payload to a truck, the truck indicates to the excavator, via the use of the truck based weighing system, the weight of the payload delivered. However, as the excavator receives no indication regarding payload weight before delivering its payload to the truck, the user is unable to determine whether the excavator is underloaded or overloaded before delivery.

To give further information on the payload being delivered, methods have also included the use of cameras to facilitate monitoring of the payloads. For example, see U.S. Pat. No. 8,405,721. Although, these methods also fail to give an accurate measurement of payload weight as they simply monitor the payload and do not calculate payload weight.

Other methods of calculating payload weight assume a centre of gravity of the payload whilst in the excavator bucket and calculate a payload weight therefrom. However, if the actual payload is forward or rear of the assumed centre of gravity, this can introduce errors in payload calculation.

OBJECT OF THE INVENTION

It is an aim of this invention to provide a system and method of calculating a payload weight which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a system of calculating a payload weight, the system including:

a first sensor configured to measure a first load associated with a first member of a lifting machine;

a second sensor configured to measure a second load associated with a second member of the lifting machine; and a calculating device configured to calculate the payload weight being carried by the lifting machine based on the first load and the second load.

Preferably, the first member is in the form of a first ram. Preferably, the first ram is connected to a lifting member of the lifting machine. In a further form, the first member is in the form of a first shear pin.

Preferably, the second member is in the form of a second ram. Preferably, the second ram is connected to the lifting member. In a further form, the second member is in the form of a second shear pin.

Preferably, the lifting member includes an excavator arm and a bucket. Preferably, the excavator arm includes a stick and a boom. Preferably, the stick is pivotally connected to the bucket. Preferably, the boom is pivotally connected to the stick. In a further form, the lifting member includes the first member and the second. For example, the first member is in the form of the stick and the second member is in the form of the boom.

Preferably, the first load is in the form of pressure. Preferably, the first sensor is fitted to a manifold connected to the ram in order to measure the first load in the form of pressure.

Preferably, the system includes a first related sensor. Preferably, the first related sensor is configured to measure a first related load associated with the first ram. Preferably, the first related load is in the form of pressure.

Alternatively, the first load is related to a first load cell. Preferably, in this further form, the first sensor is fitted to the first shear pin and/or the lifting member to measure the first load associated with the lifting machine.

Preferably, the second load is in the form of pressure. Preferably, the second sensor is fitted to a manifold connected to the ram in order to measure the second load in the form of pressure.

Preferably, the system includes a second related sensor. Preferably, the second related sensor is configured to measure a second related load associated with the second ram. Preferably, the second related load is in the form of pressure.

Alternatively, the second load is related to a second load cell. Preferably, in this further form, the second sensor is fitted to the second shear pin and/or lifting member to measure the second load associated with the lifting machine.

Preferably, the rams are hydraulic. Preferably, the pressure related to the rams actuates a shaft of the ram.

Preferably, the calculating device is configured to calculate a first force based on the first load. Preferably, the calculating device is configured to calculate a first force based on the first load and the first related load. Preferably, the calculating device determines a pressure difference between the first load and the first related load in order to calculate the first force.

Preferably, the calculating device is configured to calculate a second force based on the second load. Preferably, the calculating device is configured to calculate a second force based on the second load and the second related load. Preferably, the calculating device determines a pressure difference between the second load and the second related load in order to calculate the second force.

Preferably, the calculating device is configured to calculate a centre of gravity of the payload, which is subsequently used to calculate the payload weight.

Preferably, the calculating device is configured to calculate the centre of gravity of the payload by summing moments about a first point and a second point. Preferably, in summing moments about the first point and second point, the calculating device assigns the payload weight as an unknown weight force.

Preferably, the calculating device is configured to sum moments about the first point based on the first force and unknown weight force. Preferably, in summing the moments about the first point, the calculating device is configured to retrieve a distance from the first point to the first force.

Preferably, the calculating device retrieves the distance from the first point to the first force with the assistance of one or more movement sensors. Preferably, the one or more movement sensors establish the stroke of the first ram and second ram.

Preferably, the calculating device retrieves the distance from the first point to the first force by a determined geometrical relationship between the first point and the first force.

Preferably, the calculating device is configured to sum moments about the second point based on the first force, second force and unknown weight force. Preferably, in summing the moments about the second point, the calculating device is configured to retrieve a distance from the second point to the second force.

Preferably, the calculating device retrieves the distance from the second point to the second force with the assistance of the one or more movement sensors.

Preferably, the calculating device retrieves the distance from the second point to the second force by a determined geometrical relationship between the second point and second first force. Preferably, in summing the moments about the second point, the calculating device is configured to retrieve a distance between the first point and the second point.

Preferably, the calculating device retrieves the distance from the first point to the second point with the assistance of the one or more movement sensors.

Preferably, the calculating device retrieves the distance between the first point and the second point by a determined geometrical relationship between the first point and the second point. Preferably, the distances are parallel to an axis that is not substantially parallel a gravity direction of the payload weight.

Preferably, the calculating device communicates the payload weight to a display of a user interface.

Preferably, the system further includes a recording device to record the values of the first force, the second force and/or the payload weight.

Preferably, the calculating device is configured to calculate a total payload weight delivered to a truck from the recorded payload weights.

Preferably, the calculating device is configured to estimate a fatigue life of the lifting member from the recorded values of the first force, the second force and/or the payload weight.

In another form the invention resides in a method of calculating a payload weight, the method including the steps of:

measuring a first load associated with a first member of a lifting machine;

measuring a second load associated with a second member of a lifting machine; and calculating the payload weight being carried by the lifting machine based on the measured first load and the measured second load.

Preferably, the step of measuring the first load associated with the first member of the lifting machine includes measuring a pressure related to a first ram. In a further form, the step of measuring the first load associated with the first member of the lifting machine includes measuring an electrical load of a first load cell associated with a first shear pin and/or a lifting member of the lifting machine.

Preferably, the step of measuring the second load associated with the lifting machine includes measuring a pressure related to a second ram. In a further form, the step of measuring the second load associated with the lifting machine includes measuring an electrical load of a second load cell associated with a second shear pin and/or the lifting member of the lifting machine.

Preferably, the step of calculating the weight of the payload includes calculating a first force based on the first load and a second force based on the second load.

Preferably, the step of calculating the first force based on the first load in the form of pressure includes retrieving a related first load from a related first sensor. Preferably, calculating the first force based on the first load includes calculating a pressure difference between the first load and the first related load.

Preferably, the step of calculating the second force based on the second load in the form of pressure includes retrieving a related second load from a related second sensor. Preferably, calculating the second force based on the second load includes calculating a pressure difference between the second load and the second related load.

Preferably, the step of calculating payload weight includes calculating a centre of gravity of the payload.

Preferably, the step of calculating the centre of gravity of the payload includes summing moments about a first point and a second point.

Preferably, the step of summing moments about the first point includes retrieving a distance from the first point to the first force. Preferably, the distance from the first point to the first force is retrieved from a determined geometrical relationship between the first point and the first force.

Preferably, the step of summing moments about the second point includes retrieving a distance from the second point to the second force. Preferably, the distance from the second point to the second force is retrieved from a determined geometrical relationship between the second point and the second force.

Preferably, the step of summing moments about the second point includes retrieving a distance between the first point and the second point. Preferably, the distance between the first point and the second point is retrieved from a determined geometrical relationship between the first point and the second point.

Preferably, the method further includes alarming a user when the payload weight exceeds a predetermined limit.

Preferably, the method further includes recording the values of the first force, the second force and/or the payload weight. Preferably, the recorded payload weights are used to asses a loading state of a downstream device.

Preferably, the method further includes calculating a total payload weight delivered to a truck from the recorded payload weights delivered thereto.

Preferably, the method further includes estimating a fatigue life of the lifting member from the recoded values of the first force, the second force and/or the payload weight.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
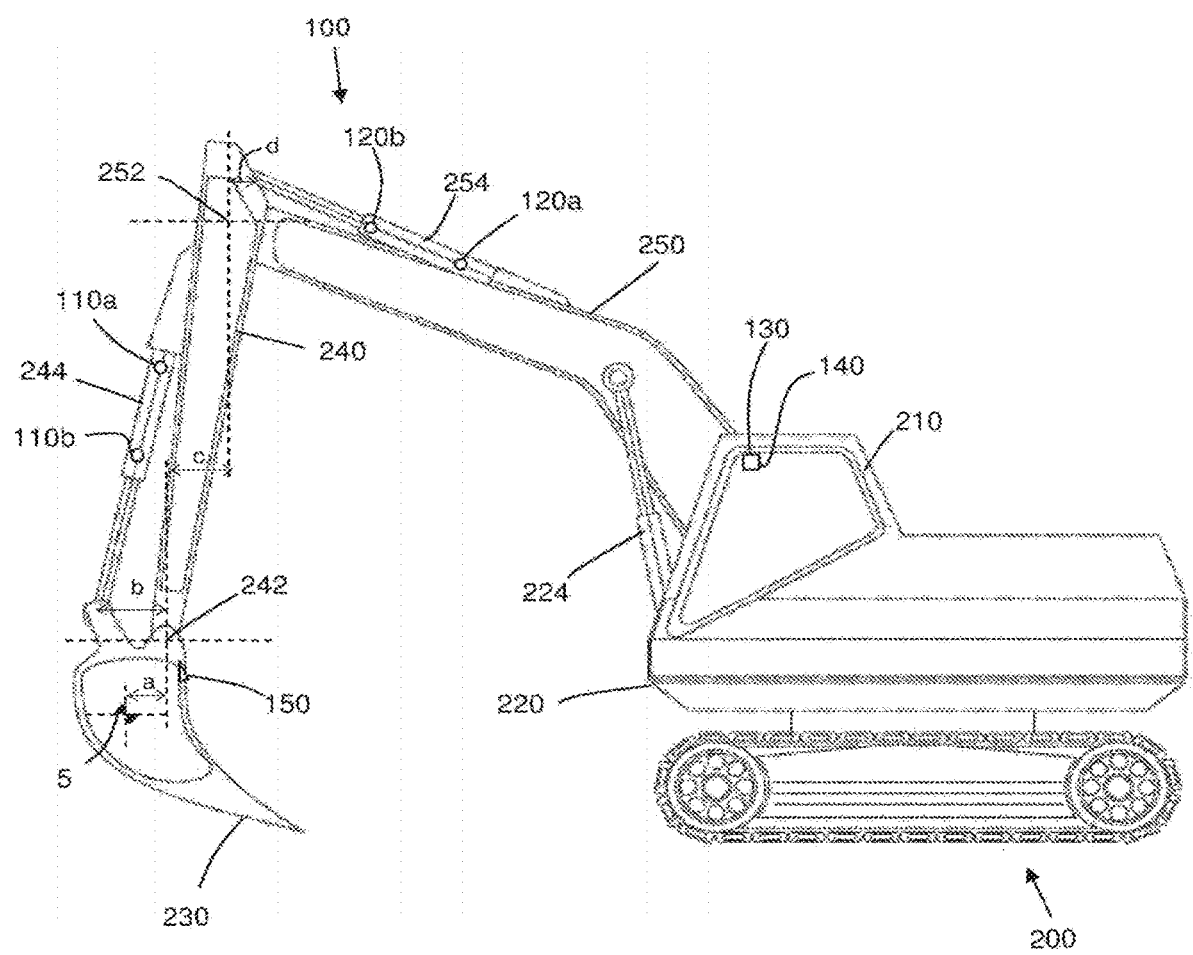
FIG. 1 illustrates a system of calculating a payload weight, according to an embodiment of the invention, fitted to an excavator.

FIG. 1 illustrates a system 100 of calculating a payload weight, according to an embodiment of the invention, fitted to a lifting machine in the form of an excavator 200. It would be appreciated that the system 100 may be fitted to other lifting machines including a backhoe or crane.

The excavator 200 includes a cab 210, a cab platform 220 and a lifting member having an excavator arm and a bucket 230. The excavator arm has includes a stick 240 and a boom 250. The bucket 230 is pivotally connected to the stick 240 about a first point 242. The boom 250 is pivotally connected to the stick 240 about a second point 252. The boom 250 is also pivotally connected to the cab platform 220. The payload in the bucket 230 also defines an axis 5 which is not substantially parallel to a gravity direction of the payload weight.

The excavator 200 includes a first ram 244 associated with the stick 240. The excavator 200 also includes a second ram 254 associated with the boom 250. In addition, a further ram 224 is located between the cab platform 220 and boom 250. It would be appreciated that the further ram 224 is associated the boom 250 and, similarly, that the second ram 254 is also, for example, associated with the stick 240.

The rams 224, 244, 254 are hydraulic rams in this embodiment. The rams 224, 244, 254 also include a communication module that is configured to communicate a stroke measurement from the rams 224, 244, 254. As would be appreciated by a person skilled in the art, the stroke measurement of the rams 224, 244, 254 indicates, for example, an extension of a shaft from a body of each of the rams 224, 244, 254. This also allows for a geometrical relationship between, for example, the excavator arm and bucket 230 to be established.

The first ram 244 applies a force onto the bucket 230. Depending on the stroke measurement of the first ram 254, a distance 'b', in a direction substantially parallel with the axis 5, is defined between the first point 242 and the connection between the bucket 230 and the first ram 244. The stroke measurement is measured with one or more movement sensors.

The second ram 254 applies a force onto the stick 240. Depending on the stroke measurement of the second ram 254, a distance 'd', in a direction substantially parallel with the axis 5, is defined between the second point 252 and the connection between the stick 240 and second ram 254. Similarly, depending on the stroke measurement of the second ram 254, a distance 'c', in a direction substantially parallel with the axis 5, is defined between the second point 252 and the first point 242. The stroke measurement is measured with the one or more movement sensors.

The system 100 includes a first sensor 110a, a first related sensor 110b, a second sensor 120a, a second related sensor 120b and a calculating device 130. The system 100 also includes a user interface 140 and a recording device. The first sensor 110a, the first related sensor 110b, the second sensor 120a, the second related sensor 120b, the user interface 140 and the recording device are in communication with the calculating device 130. It would be appreciated that this communication may be wire or wireless communication.

The first sensor 110a, the first related sensor 110b, the second sensor 120a and the second related sensor 120b are in the form of pressure sensors.

The first sensor 110a is fitted to a manifold (not shown) in order to measure a first load associated with the first ram 244. The first ram 244 therefore form a first member of the lifting machine in this embodiment. The first related sensor 110b is fitted to a manifold (not shown) in order to measure a first related load associated with the first ram 244. As would be appreciated by a person skilled in the art, the pressure difference between the first load and the first related load allows a first force of the first ram 244 to be determined, as further discussed below.

The second sensor 120a is fitted to a manifold (not shown) in order to measure a second load associated with the second ram 254. The second ram 254 therefore form a second member of the lifting machine in this embodiment. The second related sensor 120b is fitted to a manifold (not shown) in order to measure a second related load associated with the second ram 254. Similar to the above, the pressure difference between the second load and the second related load allows a second force of the second ram 254 to be determined, as further discussed below.

The first sensor 110a, the first related sensor 110b, the second sensors 120a and the second related sensor 120b communicate their measured pressures to the calculating device 130. It would be appreciated in further embodiments that other sensors including load cells may be used to carry out the present invention. The load cells may be fitted to the lifting member or incorporated into, for instance, shear pins. The load cells would give an indication of the forces discussed below that are used to calculate the payload weight.

In this embodiment, the calculating device 130 is configured to calculate a centre of gravity of the payload and a payload weight in the bucket 230 based on the loads measured by the first sensor 110a, the first related sensor 110b, the second sensor 120a and second related sensor 120b, as further outlined below. It is noted here however, that a person skilled in the art would appreciate that the centre of gravity of the payload and payload weight, in the present invention, may be calculated with the first sensor 110a and second sensor 120b alone if the related first and second loads are known or estimated. For example, use of a pressure relief valve may keep the related first and second loads constant.

Further to the above, as part of calculating the centre of gravity and weight of the payload in the bucket 230, the calculating device 130 is configured to calculate a first force applied by the first ram 244 based on the pressure difference between the first load and first related load. For example, the first related load is subtracted from first load and then multiplied by the area over which the first loads act to determine the first force. The area over which the first loads act is either side of a piston in the first ram 244. Similarly, the calculating device 130 is also configured to calculate a second force applied by the second ram 254 based on the second load and second related load.

Furthermore, as part of calculating the centre of gravity and weight of the payload in the bucket 230, the calculating device 130 is configured to receive stroke measurements from the first ram 244 and the second ram 254. The calculating device 130 may also receive stroke measurements from the ram 224. In response to receiving the stroke measurements related to the first ram 244 and the second ram 254, the calculating device 130 is configured to retrieve values of distance 'a', distance 'b' and distance 'c' from a determined geometrical relationships therebetween.

The user interface 140 includes a display. The user interface 140 is configured to receive communication from the calculating device 130 in order to display the calculated payload weight through the display. The user interface 140 is incorporated into a housing for the calculating device 130 in this embodiment.

The user interface 140 is also configured to indicate an alarm. The alarm includes a visual alarm that is indicated through the display of the user interface 140. The alarm triggers when a payload weight, calculated by the calculating device 130, exceeds a predetermined limit. The predetermined limit is at or near the maximum payload weight allowable in the bucket 230.

The recording device records information received and calculated by the calculating device 130. That is, the recording device records the values of the calculated payload centre of gravity and payload weight from the calculating device 130. The recording device also records the values of the first force and the second force. The recorded values on the recording device may be used, for example, to calculate an estimated fatigue life, as further discussed below. The recorded values may also be used to calculate the total payload weight delivered to, for instance, a truck.

Figure 2:
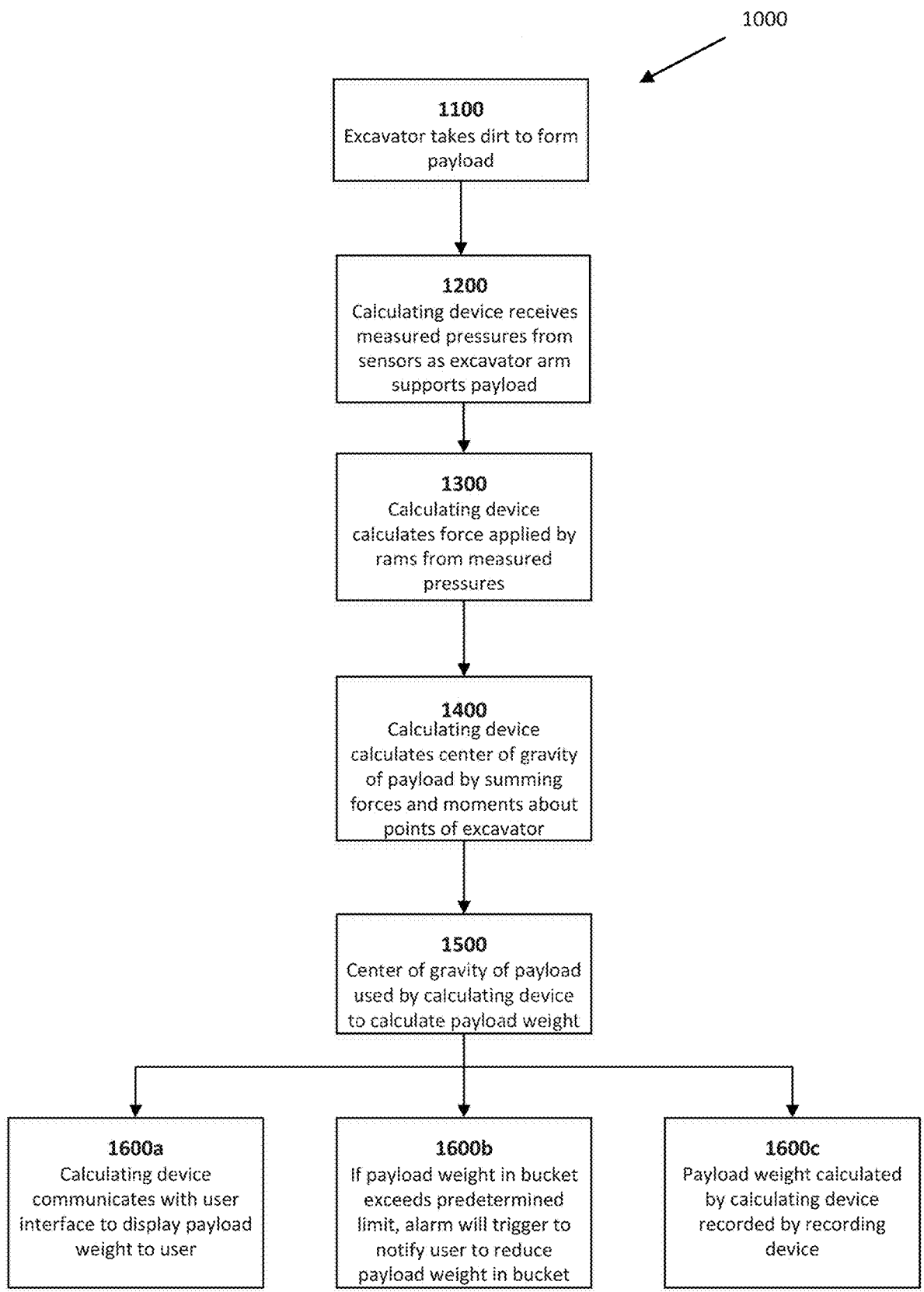
FIG. 2 illustrates a flow chart of a method of calculating a payload weight with reference to FIG. 1.

FIG. 2 illustrates a method 1000 of calculating a payload weight with reference to FIG. 1.

At step 1100, the excavator 200 takes a scoop of dirt which forms the payload in this embodiment.

At step 1200, the calculating device 130 receives the measured pressures from the first sensor 110a, first related sensor 110b, the second sensor 120a and the second related sensor 120b, as the excavator arm supports the payload above the ground.

At step 1300, the calculating device 130 calculates the corresponding force applied by the first ram 244 and the second ram 254 from the pressures measured by the first sensor 110a, the first related sensor 110b, the second sensor 120a and the second related sensor 120b, respectively. That is, as mentioned above, the calculating device 130 is configured to calculate the corresponding force applied by the first ram 244 and the second ram 254 based on the area over which the measured pressures are applied. It would be appreciated that other forces may be used in carrying out the present invention including those through shear pins, as mentioned above.

Figure 3:
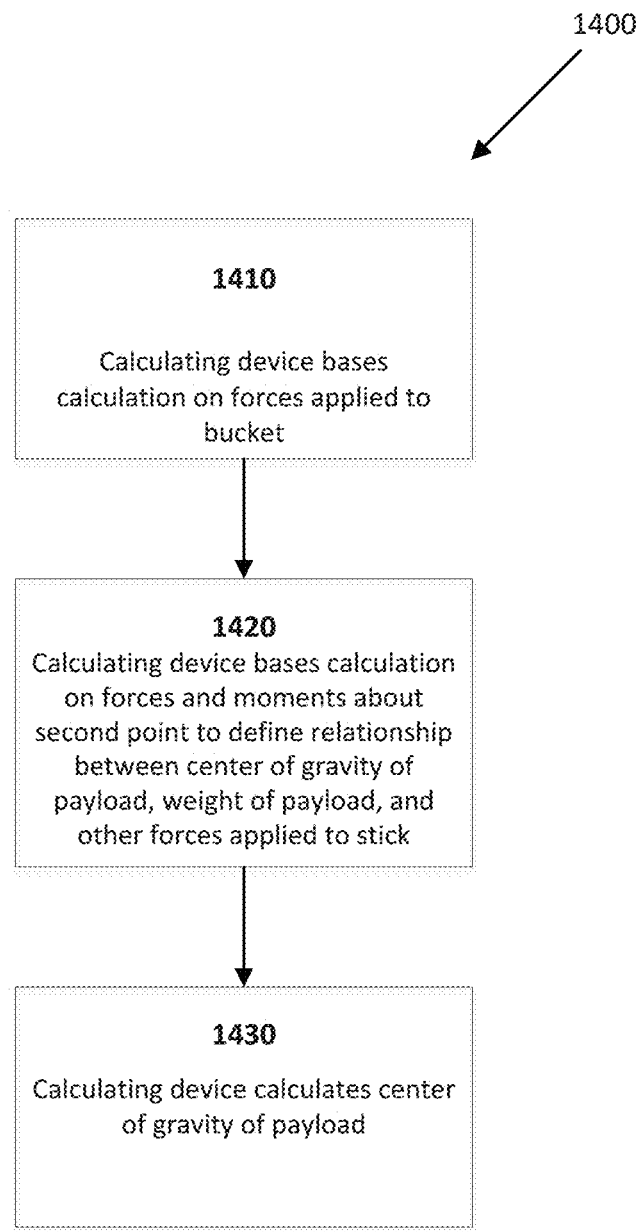
FIG. 3 illustrates a flow chart for part of the method of calculating the payload weight outlined in FIG. 2.

At step 1400, with the corresponding force applied by the second ram 254 and the first ram 244, the calculation device 130 calculates the centre of gravity of the payload by summing the forces and moments about points of the excavator 200. Whilst it would be appreciated by a person skilled in the art that the summation of forces and moments may be taken about various points of the excavator 200, to simplify the geometry, for example, the following method is outlined in FIG. 3.

At step 1410, the calculating device 130 first bases a calculation on the forces applied to the bucket 230. That is, the forces and moments about the first point 242 are summed to define a relationship between the centre of gravity of the payload and the weight of the payload and the other forces applied to the bucket 230 (i.e. the first force from the first ram 244).

As would be appreciated by a person skilled in the art, in calculating the moment about the first point 242 due to the force from the first ram 244, the calculating device 130 retrieves the value of distance 'b'. That is, in this embodiment, the calculating device 130 receives the stroke measurement from the first ram 244. With the stroke measurement of the first ram 244, the calculating device 130 retrieves distance 'b' from a determined geometrical relationship between the first point 242 and stroke measurement of the first ram 244.

It would also be appreciated that in calculating the moment about the first point 242, the calculating device 130 also resolves the force from the first ram 244 into a vertical force substantially perpendicular (i.e. not substantially parallel) with the axis 5, from the determined geometrical relationship between the first point 242 and stroke measurement of the first ram 244. The moment about the first point 242 due to the force from the first ram 244 is then calculated by multiplying distance 'b' with the resolved vertical force from the first ram 244 that is substantially perpendicular (i.e. not substantially parallel) with the axis 5.

The moment created about the first point 242 due to the weight of the payload at its centre of gravity is assigned to be an unknown weight force at an unknown distance 'a'. The distance 'a' is in a direction substantially parallel (i.e. not substantially parallel) with the axis 5 and, as would be appreciated by a person skilled in the art, represents the distance the centre of gravity is from the first point 242.

At step 1420, the calculating device 130 then bases a calculation on the forces and moments about the second point 252 to define a further relationship between the centre of gravity of the payload, the weight of the payload and the other forces applied to the stick 240 (i.e. the force from the second ram 254).

Similar to calculating the moment about the first point 242 due to the force from the first ram 244, in calculating the moment about second point 252 due to the force from the second ram 254, the calculating device 130 retrieves the value of distance 'd'. That is, in this embodiment, the calculating device 130 receives the stroke measurement from the second ram 254. With the stroke measurement of the second ram 254, the calculating device 130 retrieves distance 'd' from a determined geometrical relationship between the second point 252 and stroke measurement of the second ram 254. The calculating device 130 also resolves the force from the second ram 254 into a vertical force substantially perpendicular (i.e. not substantially parallel) with the axis 5, from the determined geometrical relationship between the second point 252 and stroke measurement of the second ram 254.

The moment about the second point 252 due to the force from the second ram 254 is then calculated by multiplying distance 'd' with the resolved vertical force from the second ram 254 that is substantially perpendicular (i.e. not substantially parallel) with the axis 5.

In addition, in calculating the moment about second point 252 due to the force from the second ram 254 and weight of the payload, the calculating device 130 retrieves the value of distance 'c'. That is, with the stroke measurement of the second ram 254, the calculating device 130 retrieves distance 'c' from a determined geometrical relationship between the second point 252 and the first point 242.

With the distance 'c', the moment about the second point 252 due to the force from the first ram 244 is also calculated by multiplying the sum of distance 'b' and distance 'c' with the resolved vertical force from the first ram 244 that is substantially perpendicular (i.e. not substantially parallel) with the axis 5. The moment about the second point 252 created due to the weight of the payload at its centre of gravity is assumed to be the unknown weight force multiplied by the sum of distance 'c' and unknown distance 'a'.

At step 1430, from the abovementioned relationships, the calculating device 130 then calculates the centre of gravity of the payload. That is, as would be appreciated by a person skilled in the art, the calculating device 130 uses the sum of moments and forces about the points 242, 252 to calculate the unknown distance 'a' (i.e. the centre of gravity of payload). It would be appreciated that the centre of gravity in this calculation is in a direction substantially parallel with the boom 250 and the stick 240 of the excavator arm.

Following the above, at step 1500, the centre of gravity of the payload (i.e. distance 'a') is then used by the calculating device 130 to calculate the payload weight. That is, as it would be appreciated by a person skilled in the art, the calculated centre of gravity of the payload may be substituted into the abovementioned relationships to find the payload weight.

In response to calculating the payload weight, the payload weight may be used in a variety of applications. For example, the payload weight may used in steps 1600a, 1600b, 1600c and/or 1600d, as outlined below.

At step 1600a, in response to calculating the payload weight, the calculating device 130 communicates with the user interface 140 to display the payload weight to a user.

At step 1600b, if the payload weight in the bucket 230 exceeds the predetermined limit, the alarm will trigger to notify the user to reduce the payload weight in the bucket 230. That is, the visual alarm will be displayed through the display of the user interface 140. The audio alarm will also sound though speakers of the user interface 140.

At step 1600c, the payload weight calculated by the calculating device 130 is recorded by the recording device. The first force and the second force are also recorded.

From the recorded values, the calculating device 130 is configured to subsequently determine an estimated fatigue life of at least the excavator arm and the bucket 230. That is, for example, the calculating device 130 determines where the excavator arm is in its fatigue life from the recorded values. The calculating device 130 then estimates the remaining fatigue life of the excavator arm using an estimated load being transferred through the excavator arm. The estimated load is typically an average of loads previously transferred through the excavator, determined from the recorded values. In response to a predetermined limit of fatigue life being reached, the calculating device 130 communicates with the alarm to alert the user.

From the recorded values, the calculating device 130 may also determine the total payload weight delivered to a further device. For example, the calculating device 130 may determine the total payload weight delivered to a truck. If the truck has been overloaded, the calculating device 130 may alert the user through the user interface 140. Similarly, the total payload weight allows one to asses the loading state of a further downstream device.

The system 100 allows for accurate calculation of the centre of gravity and payload weight in the bucket 230 from two or more moment calculations. Displaying the calculated weight of the payload to the user, via the user interface 140, allows the user to take appropriate action if the payload is overloading or underloading the bucket 230. In this regard, productivity is increased if the user avoids having to make further trips due to underloading the bucket 230. Furthermore, damage is avoided if, for example, the payload is overloading the bucket 230. In addition, the audio alarm further ensures that a user does not overload the excavator 200 when, for instance, the user is not directly paying attention to the display of the user interface 140.

By alerting the user when the estimated fatigue life of at least part of the excavator arm or the bucket 230 is reached, the system 100 also allows the user to undertake preventative maintenance to substantially ensure components of the excavator 200 do not fail without warning. This avoids unexpected downtime of the excavator 200, which increases productivity. Furthermore, by alerting when the payloads delivered are overloading the truck, further safety issues and potential failures are avoided.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. For example, the weight of the payload may be calculated based on the measured pressure of the first sensor 110 and the measured pressure of the second sensor 120, whilst not substantially defining the centre of gravity of the payload.

The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A system of calculating a payload weight, the system including:
   a lifting machine including a lifting member, the lifting member having an excavator arm and a bucket, wherein the bucket is pivotally connected to the excavator arm;
   a first sensor configured to measure a first load associated with a first member connected to the excavator arm of the lifting machine;

a second sensor configured to measure a second load associated with a second member connected to the excavator arm of the lifting machine; and a calculating device configured to calculate the payload weight being carried by the lifting machine based on the first load and the second load, wherein the calculating device is configured to calculate a center of gravity of the payload by summing moments about a first point and a second point, the center of gravity being subsequently used to calculate the payload weight, wherein the first point and the second point are located on the excavator arm, and wherein the calculating device is configured to:
calculate a first force based on the first load,
calculate a second force based on the second load,
sum moments about the first point based on the first force and the payload weight assigned as an unknown weight force, and
sum moments about the second point based on the first force, second force and the unknown weight force.

2. The system of claim 1, wherein the calculating device is configured to:
retrieve a distance from the first point to the first force in summing moments about the first point; and
retrieve a distance from the second point to the second force in summing moments about the second point.

3. The system of claim 2, wherein the distances are determined by geometrical relationship between the first point, second point, an extension of a first ram and an extension of a second ram.

4. The system of claim 1, wherein the system further includes a recording device to record the values of the first force, the second force and/or the payload weight.

5. The system of claim 4, wherein the calculating device is configured to estimate a fatigue life of the lifting member from the recoded values of the first force, the second force and/or the payload weight.

6. The system of claim 1, wherein the calculating device is configured to retrieve a distance between the first point and the second point when summing moments about the second point.

7. The system of claim 1, wherein the calculating device communicates the payload weight to a display of a user interface.

8. A method of calculating a payload weight lifted by a lifting machine including a lifting member, the lifting member having an excavator arm and a bucket, wherein the bucket is pivotally connected to the excavator arm, the method including the steps of:

measuring a first load associated with a first member connected to a lifting the excavator arm of the lifting machine;

measuring a second load associated with a second member connected to the excavator arm of the lifting machine; and calculating the payload weight being carried by the lifting machine based on the measured first load and the measured second load, wherein the step of calculating the payload weight includes calculating a center of gravity of the payload weight by summing moments about a first point and a second point, the first and second points being located on the excavator arm, wherein the step of calculating the weight of the payload includes calculating a first force based on the first load and a second force based on the second load, wherein summing moments about a first point and a second point includes summing moments about the first point based on the first force and the payload weight assigned as an unknown weight force, and summing moments about the second point based on the first force, second force and the unknown weight force.

9. The method of claim 8, wherein the step of calculating the first force based on the first load includes retrieving a related first load from a related first sensor; and the step of calculating the second force based on the second load includes retrieving a related second load from a related second sensor.

10. The method of claim 9, wherein calculating the first force based on the first load includes calculating a pressure difference between the first load and the first related load; and calculating the second force based on the second load includes calculating a pressure difference between the second load and the second related load.

11. The method of claim 8, wherein the method further includes alarming a user when the payload weight exceeds a predetermined limit.

12. The method of claim 8, wherein the method further includes recording the payload weight to asses a loading state of a downstream device.

* * * * *